(12) United States Patent
Campbell

(10) Patent No.: US 7,133,076 B1
(45) Date of Patent: Nov. 7, 2006

(54) CONTOURED SURFACE COVER PLATE FOR IMAGE SENSOR ARRAY

(75) Inventor: Scott Campbell, Pasadena, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/470,284

(22) Filed: Dec. 22, 1999

Related U.S. Application Data (60) Provisional application No. 60/113,850, filed on Dec. 24, 1998.

(51) Int. Cl.
*H04N 5/225* (2006.01)
(52) U.S. Cl. ........................ 348/340; 348/335
(58) Field of Classification Search .......... 348/340, 348/385, 335; 257/222, 239
See application file for complete search history.

(56) References Cited

U.S. PATENT DOCUMENTS

| | | | |
|---|---|---|---|
| 3,620,149 A * | 11/1971 | Ogihara | 396/533 |
| 4,055,761 A * | 10/1977 | Shimomura | 250/239 |
| 5,302,778 A * | 4/1994 | Maurinus | 174/52.4 |
| 5,359,190 A * | 10/1994 | O'Regan et al. | 250/216 |
| 5,371,397 A | 12/1994 | Maegawa et al. | 257/432 |
| 5,400,072 A | 3/1995 | Izumi et al. | 348/335 |
| 5,400,073 A * | 3/1995 | Morioka et al. | 348/335 |
| 5,587,832 A | 12/1996 | Krause | 359/385 |
| 5,600,486 A | 2/1997 | Gal et al. | 359/569 |
| 5,821,532 A * | 10/1998 | Beaman et al. | 250/239 |
| 6,122,009 A * | 9/2000 | Ueda | 348/335 |
| 6,130,448 A * | 10/2000 | Bauer et al. | 257/222 |
| 6,266,197 B1 * | 7/2001 | Glenn et al. | 359/819 |
| 2003/0137595 A1 * | 7/2003 | Takachi | 348/340 |

* cited by examiner

*Primary Examiner*—Tuan Ho
*Assistant Examiner*—Gevell Selby
(74) *Attorney, Agent, or Firm*—Dickstein Shapiro LLP (57) ABSTRACT

A cover for an image sensor array is disclosed. The cover includes a plate formed of substantially transparent material and placed adjacent to the image sensor array. The plate has a plurality of surfaces and forms a lensing structure. At least one of the plurality of surfaces is contoured into a lensing surface capable of performing an imaging improvement or enhancement function.

28 Claims, 7 Drawing Sheets

CONTOURED SURFACE COVER PLATE FOR IMAGE SENSOR ARRAY

CROSS-REFERENCE TO RELATED APPLICATIONS

This application claims benefit of the priority of U.S. Provisional Application Ser. No. 60/113,850, filed Dec. 24, 1998 and entitled "Contoured Surface of Image Plane Array Cover Plate."

BACKGROUND

The present specification generally relates to image sensor arrays, and particularly to a contoured-surface cover plate for such image sensor arrays.

When a sensor array is mounted on an image sensor assembly such as a digital camera system, the sensor array is sealed for protection by bonding a cover plate on the assembly over the sensor array. Often, the cover plate is a flat piece of transparent material, such as glass, plastic or plexiglass, which provides protection only from the environment. The cover plate offers little in terms of optical enhancement.

On the other hand, competition for cheap camera systems is driving demand for high quality optics at a low price. However, such high quality optics are difficult to design and fabricate without the use of multiple lensing elements. Therefore, the use of multiple lensing elements often drives the price up. In addition, the lensing elements, once fabricated, must be mounted and aligned to the camera system at fairly tight tolerances in positioning, focus, and attitude. This also adds to the overall cost of the camera system.

SUMMARY

The techniques described herein obviate the above described difficulties by deterministically contouring the optically-flat cover plate. The contouring allows for the use of the cover plate as an additional lensing element. The placement of the contoured cover plate in the optical path of an incident light converts a singlet lens system into a doublet system, a doublet system into a triplet system, and so on.

The contouring of the cover plate also allows using the plate as mounting structures for the lensing elements, such as lenses, filters, and polarizers. The mounting structures can have alignment marks which are used to automatically align and secure the lensing elements. Furthermore, the contouring of the cover plate enhances the ability of the lensing element to correct the aberration of Petzval field curvature. The aberration is the natural tendency for a lens to produce its image on a curved rather than a flat focal plane. Therefore, the placement of the contoured cover plate close to the image sensor often reduces this aberration.

A lensing structure may include lensing elements, mounting structures, and alignment marks.

In one aspect, the present specification involves a cover for an image sensor array. The cover includes a plate formed of substantially transparent material and placed adjacent to the image sensor array. The plate has a plurality of surfaces and forms a lensing structure. At least one of the plurality of surfaces is contoured into a lensing surface capable of performing an imaging improvement or enhancement function.

In another aspect, an image sensor camera system for converting optical data into digital image data is described. The camera system includes a lens system, an image sensor array, and sensor electronics.

The lens system carries and focuses the optical data onto the image sensor array. The lens system includes a plurality of lenses and a cover plate. The cover plate is contoured into a lensing structure for imaging improvement and enhancement function.

The image sensor array has a plurality of sensors. The sensors receive the optical data and integrate the data into electrical charge proportional to the amount of optical data collected within a particular period of time. The sensor electronics receive the electrical charge and converts the electrical charge received by the plurality of sensors into digital image data.

The details of one or more embodiments are set forth in the accompanying drawings and the description below. Other embodiments and advantages will become apparent from the following description and drawings, and from the claims.

BRIEF DESCRIPTION OF THE DRAWINGS

These and other aspects will be described in reference to the accompanying drawings wherein.

Like reference numbers and designations in the various drawings indicate like elements.

DETAILED DESCRIPTION

A detailed description of the contoured surface of an image sensor array cover plate is herein provided with respect to the figures.

Figure 1A:
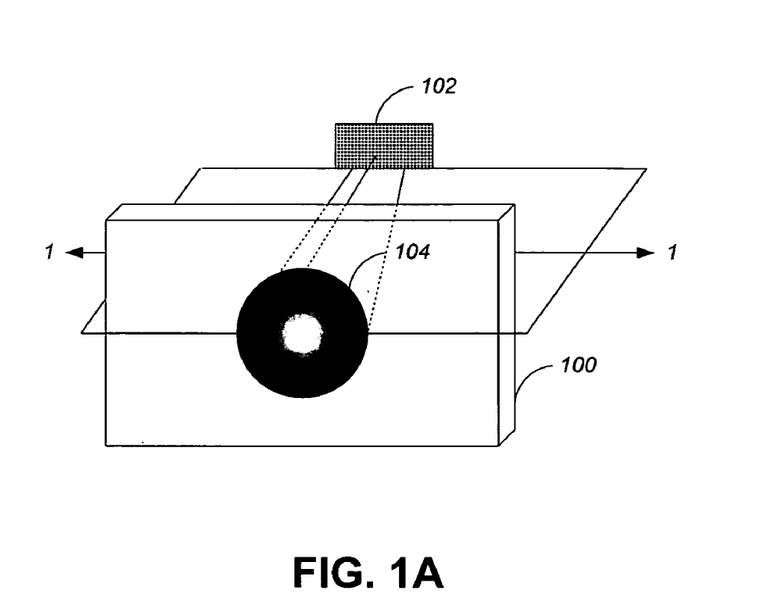
FIG. 1A is an exploded view of a cover plate.

FIG. 1A shows an exploded view of a cover plate 100 placed in front of an image sensor array 102. The image sensor array can be an array of active pixel sensors. Each active pixel sensor includes a photoreceptor, e.g., a photodiode or photogate, an in-pixel follower transistor, and an in-pixel selector transistor. The cover plate 100 is contoured to act as an additional lensing element 104. The lensing element 104 operates to enhance the focusing of light onto the image sensor array 102.

Figure 1B:
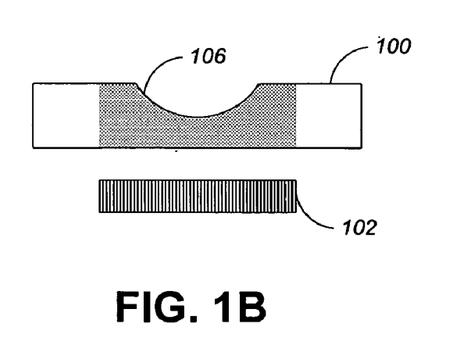
FIG. 1B is a side view of the cover plate cut along the plane 1—1 indicated in FIG. 1A.

FIG. 1B shows a side view of the cover plate 100 cut along the plane 1—1 indicated in FIG. 1A. The cover plate 100 is contoured into a negative lens with concave depression 106 and is placed in front of the image sensor array 102 to focus the light falling onto the sensor array 102.

Figure 1C:
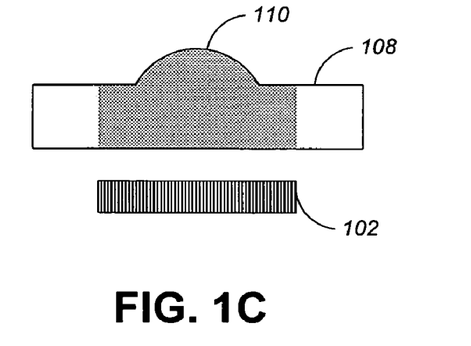
FIG. 1C is another embodiment of the cover plate contoured into a positive lens with convex protuberance.

FIG. 1C shows another embodiment of the cover plate 108 contoured into a positive lens with convex protuberance 110. The cover plate 108 is placed in front of the sensor array 102.

Figure 2A:
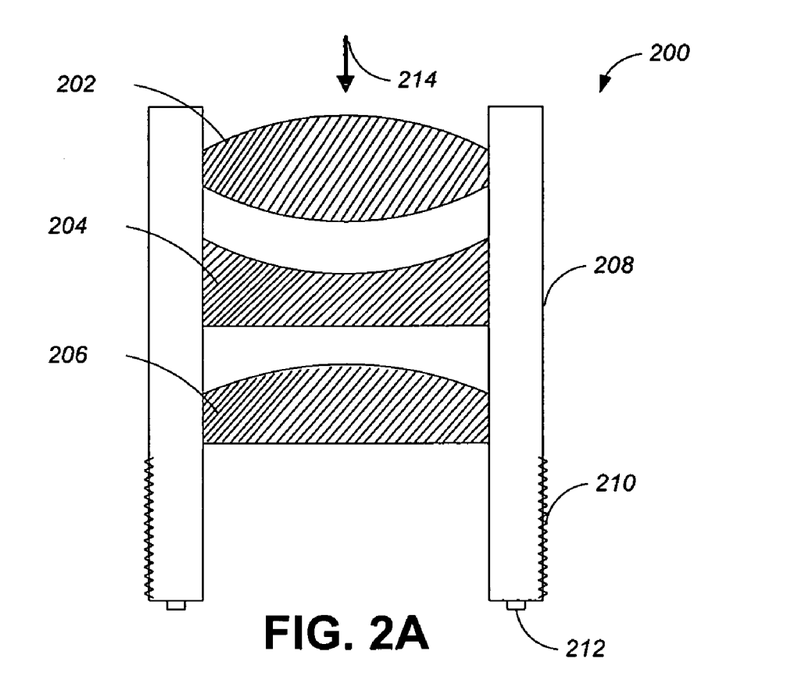
FIG. 2A is one embodiment of an existing three-element lens system.

FIG. 2A shows one embodiment of an existing three-element lens system 200. The lens system 200 includes a first convex lens 202, a second plano-concave lens 204, and a third plano-convex lens 206. The lens system 200 also includes a lens mount 208, a threaded retaining ring 210, and a guide tab 212. Light enters the lens system 200 from the direction indicated as 214.

Figure 2B:
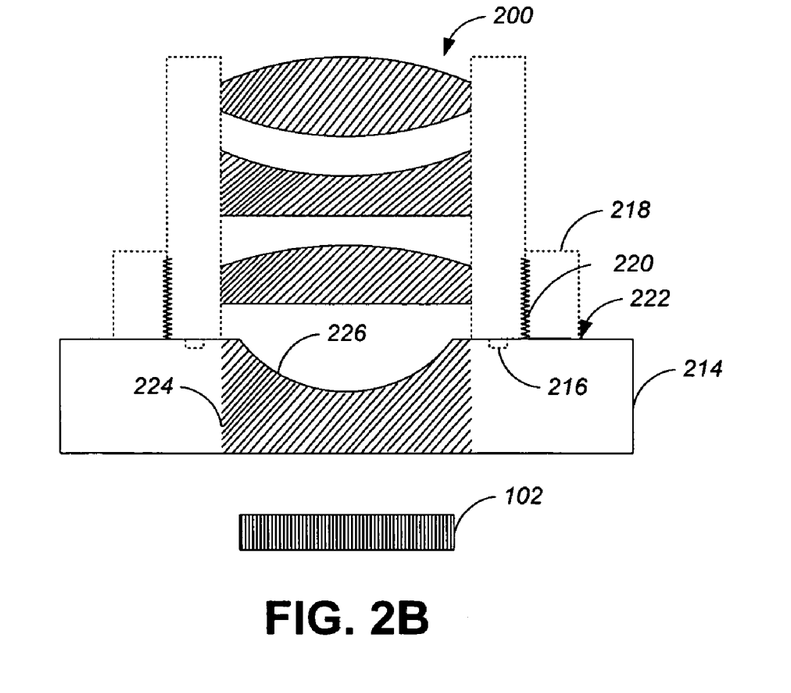
FIG. 2B is the lens system of FIG. 2A inserted into the cover plate.

FIG. 2B illustrates the lens system 200 inserted into a cover plate 214. The cover plate 214 can have a mounting structure 218 attached to the front surface 222. In another embodiment, the cover plate 214 can be a single-piece injection molded structure that includes the mounting structure 218.

The lens system 200 can be inserted into the cover plate 214 by threading it into the mounting structure 218. The threaded retaining ring 210 on the lens mount 208 is guided into a threaded ring 220 on the mounting structure 218 to lock the lens system 200 onto the cover plate 214. In an alternative embodiment, the lens system 200 can be secured onto the cover plate 214 by locking the guide tab 212 on the lens mount 208 onto the cover plate 214 using an alignment mark 216.

Once the three-element lens system 200 is firmly secured to the cover plate 214, the combination effectively forms a four-element lens system comprising the three lenses 202, 204, 206 in the lens system 200 and a contoured surface 226 of the lens 224 formed by the cover plate 214. Furthermore, the contoured lens 224 enhances the ability of the four-element lens system to correct the aberration of Petzval field curvature. The aberration is the natural tendency for a lens to produce its image on a curved rather than a flat focal plane. Therefore, the placement of the contoured cover plate 214 close to the image sensor 102 often reduces this aberration inherent in flat cover plates.

Figure 3A:
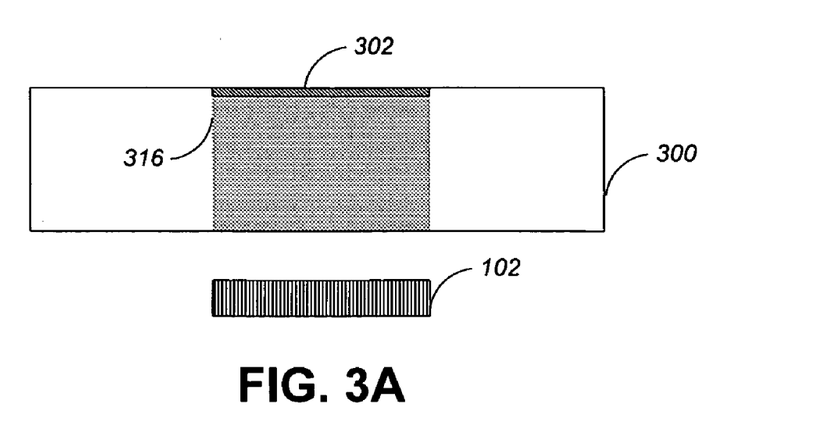
FIG. 3A is a diffraction grating blazed onto the surface of the cover plate.

FIG. 3A shows a diffraction grating 302 blazed onto the surface of a cover plate 300. The diffraction grating 302 performs similar imaging improvement function to the refractive lens system in FIG. 2B. Therefore, the cover plate 300 with the diffraction grating 302 formed on its surface acts as a diffractive lensing element 316.

Figure 3B:
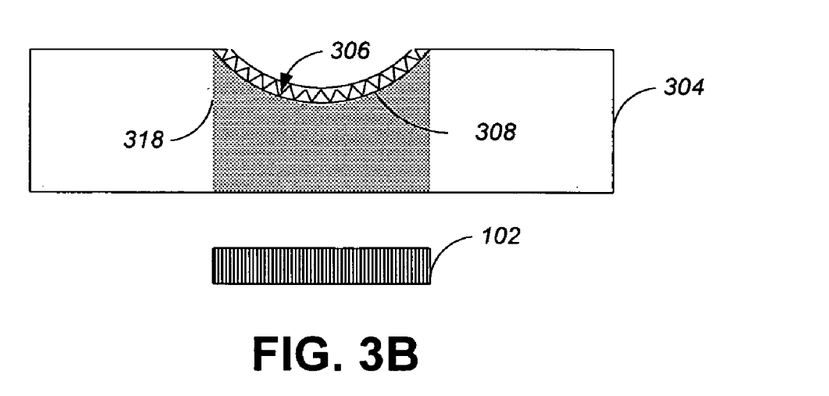
FIG. 3B is a diffraction grating blazed on a concave depression.

In another embodiment, hybridization of refractive and diffractive profiles is formed on a cover plate 304. FIG. 3B shows a diffraction grating 306 blazed on a concave depression 308 formed on the cover plate 304. The concave grating 306 can be manufactured using ruling and holographic techniques. The concave grating forms a hybrid refractive-diffractive lensing element 318.

Figure 3C:
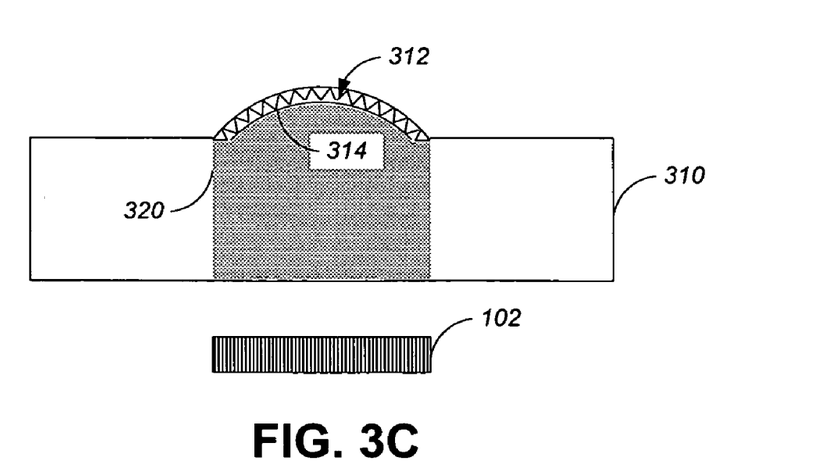
FIG. 3C is a diffraction grating blazed on a convex protuberance.

In a further embodiment, shown in FIG. 3C, a diffraction grating 312 is formed on a convex surface 314 of a cover plate 310. The convex grating 312 can be manufactured using a similar technique used for the concave grating 306 shown in FIG. 3B. The convex grating forms a hybrid refractive-diffractive lensing element 320.

Figure 4A:
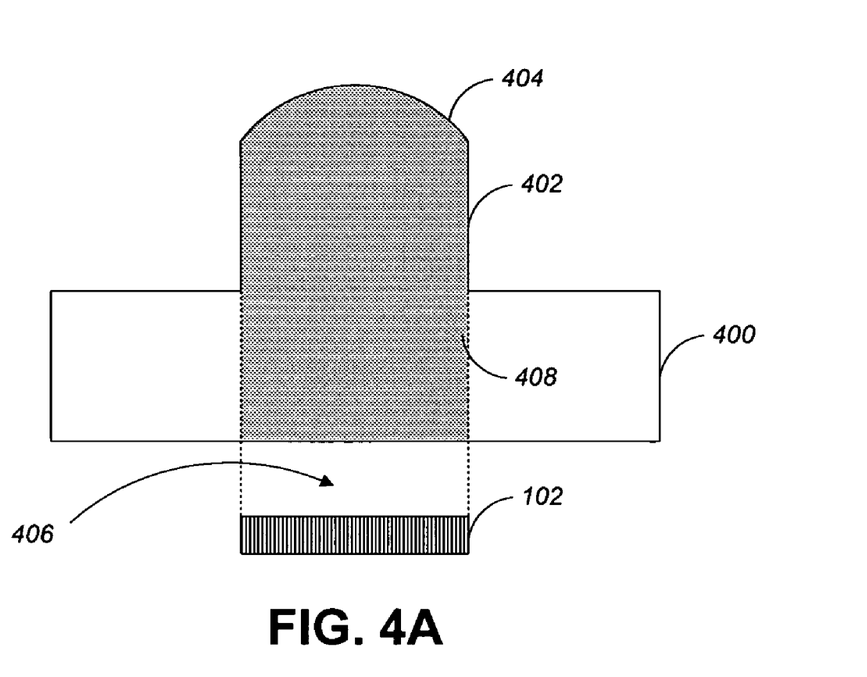
FIG. 4A is an injection molded cover plate having a post and a convex lensing surface.

FIG. 4A shows an injection-molded cover plate 400 having a post 402 and a convex lensing surface 404. The post 402 and the lensing surface 404 form a complete lens system and thereby eliminate the need for additional lenses. The post 402 and the lensing surface 404 are formed over the sensor array region 406 to direct the light onto the sensor array 102. The post 402 and the lensing surface 404 form a lensing element 408.

Figure 4B:
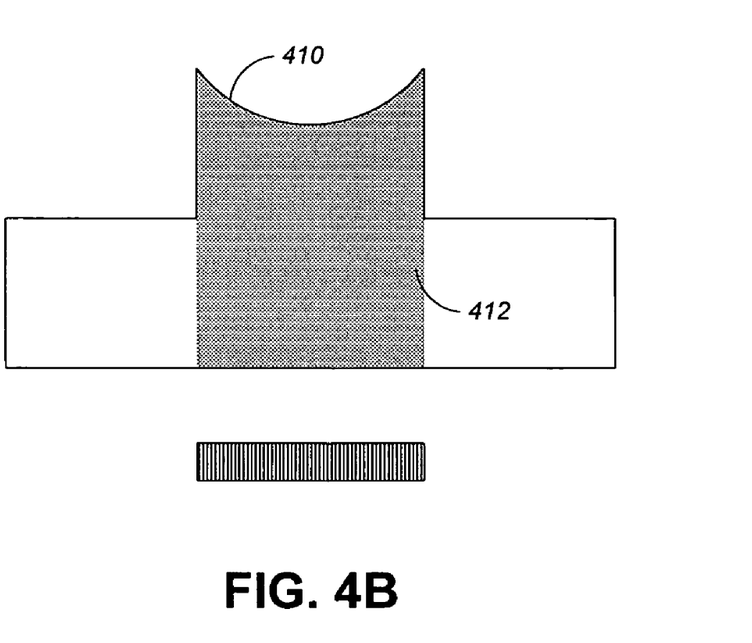
FIG. 4B is an injection molded cover plate having a post and a concave lensing surface.

In an alternative embodiment, shown in FIG. 4B, the lensing surface 410 can be contoured as a concave depression forming a lensing element 412.

FIGS. 5A through 5H show several different embodiments of a mounting structure 500, 502. The mounting structure 500, 502 is formed over the sensor array. The mounting structure 500, 502 is configured to allow the lens system to be easily and quickly mounted onto the cover plate 504.

Figure 5A:
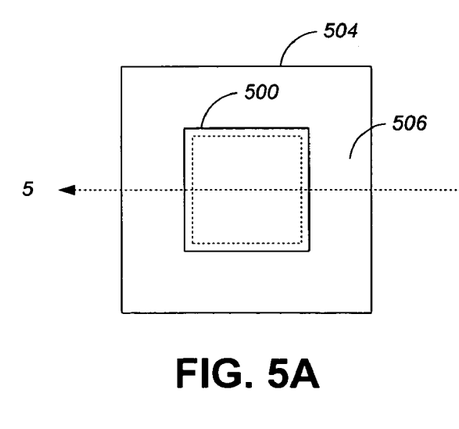
FIGS. 5A and 5B show top views of the cover plates including mounting structures.
Figure 5B:
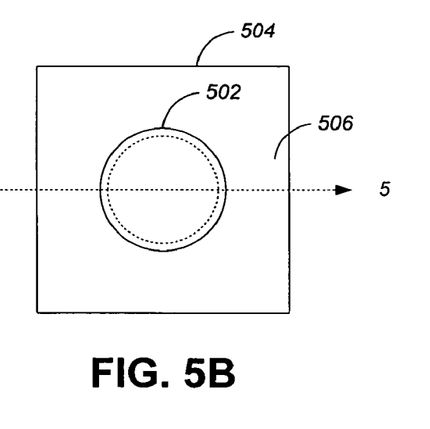

FIG. 5A shows a top view of the cover plate 504 including the mounting structure 500 formed on the top surface 506 of the cover plate 504. In this embodiment, the mounting structure 500 forms a square pattern, which allows a square-shaped lens mount to be mounted securely to the mounting structure 500. FIG. 5B shows a circular-shaped mounting structure 502 formed on the surface 506 of the cover plate 504.

FIGS. 5C through 5H show several different embodiments of the mounting structure 500 from the side. The side views are formed by slicing the cover plate 504 along the line 5—5.

Figure 5C:
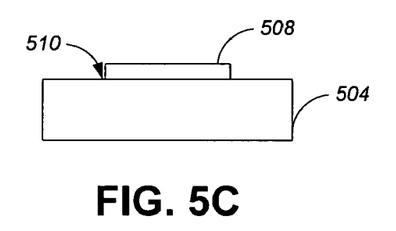
FIGS. 5C through 5H show different embodiments of the mounting structure from the side.

FIG. 5C shows a mounting structure formed with a mesa-like protrusion 508 on the surface 510 of the cover plate 504. The protrusion 508 can be a clear material attached to the front surface of the cover plate 504 or injection molded into a single-piece cover plate 504. The protrusion 508 can have a threaded retaining ring on the outside wall for easy insertion, focus and removal of the lens system.

Figure 5D:
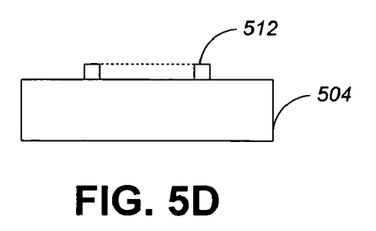

FIG. 5D shows a variation of the mounting structure shown in FIG. 5C. The mounting structure in FIG. 5D can be formed with a hollowed-out mesa-like protrusion or a ringed-wall structure attached to the cover plate 504.

Figure 5E:
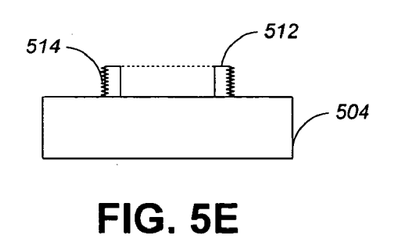
Figure 5F:
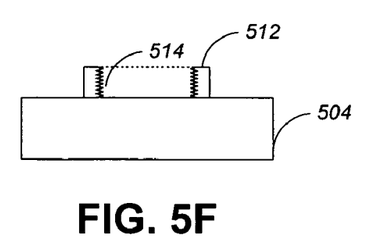

FIGS. 5E and 5F show two variations of the ringed mounting structure 512 shown in FIG. 5D. FIG. 5E shows a threaded retaining ring 514 on the outside wall of the ringed structure 512. FIG. 5F shows the threaded retaining ring 514 on the inside wall of the ringed structure 512. The threaded retaining ring 514 is used to mount and securely attach the lens mount to the mounting structure 512.

Figure 5G:
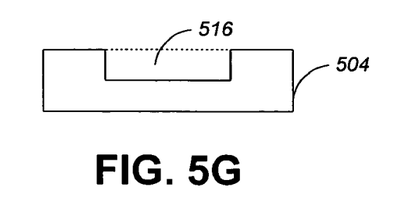
Figure 5H:
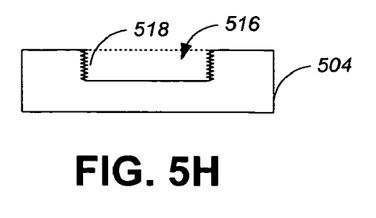

FIGS. 5G and 5H show a mounting structure formed with a well-like depression 516 in the cover plate 504. The depression 516 can be used to lock the lens mount onto the cover plate 504. FIG. 5H also shows a threaded retaining ring 518 on the side wall of the well-like depression 516 for locking the lens mount.

Figure 6A:
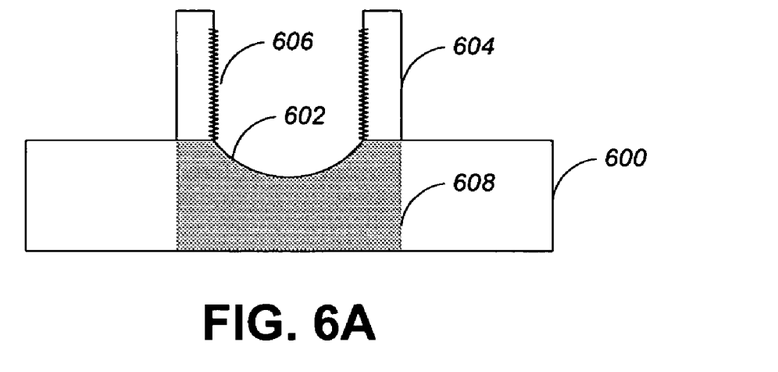
FIGS. 6A through 6C show different embodiments of the cover plate having a combination of lensing elements and mounting structures.
Figure 6B:
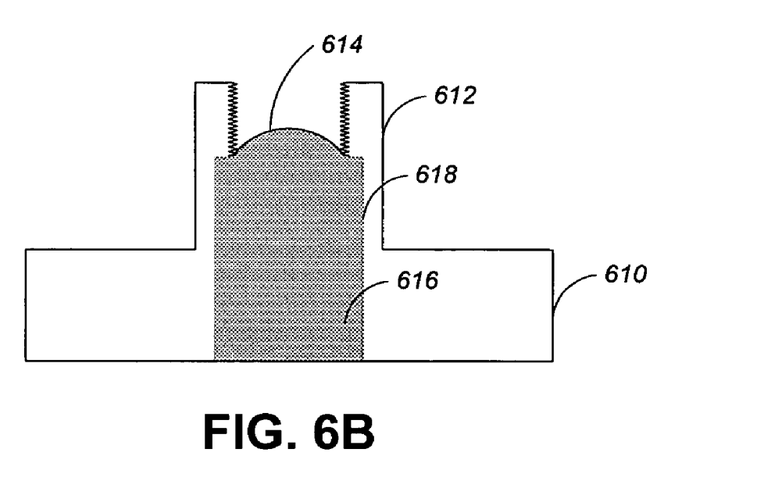
Figure 6C:
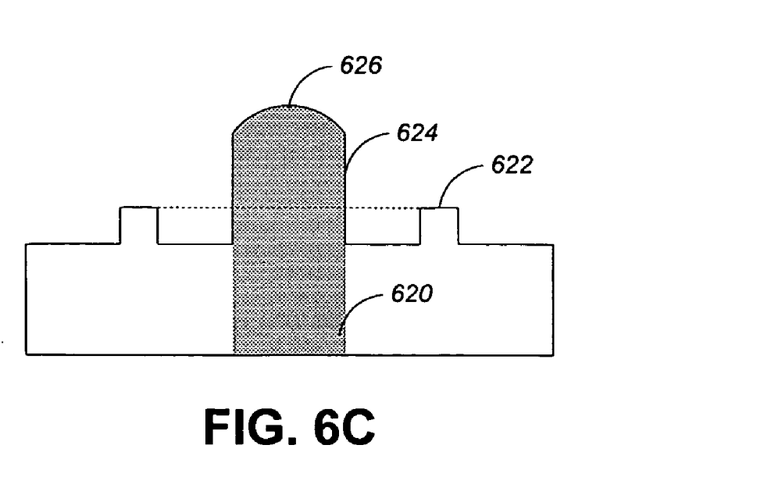

FIGS. 6A through 6C show different embodiments of the cover plate having a combination of lensing elements and mounting structures.

FIG. 6A shows a cover plate 600 having a lensing element 608 and a mounting structure 604. The lensing element 608 is formed with a concave lensing surface 602. The mounting structure 604 can have a threaded retaining ring 606 on the inside or outside wall of the mounting structure 604.

FIG. 6B shows another combination of a lensing element 616 and a mounting structure 612. The lensing element 616 is formed with a post 618 and a convex lensing surface 614 at the top of the post 618.

FIG. 6C shows a combination of a ringed mounting structure 622 and a lensing element 620 in the middle. The lensing element 620 is formed with a post 624 and a convex lensing surface 626.

Figure 7A:
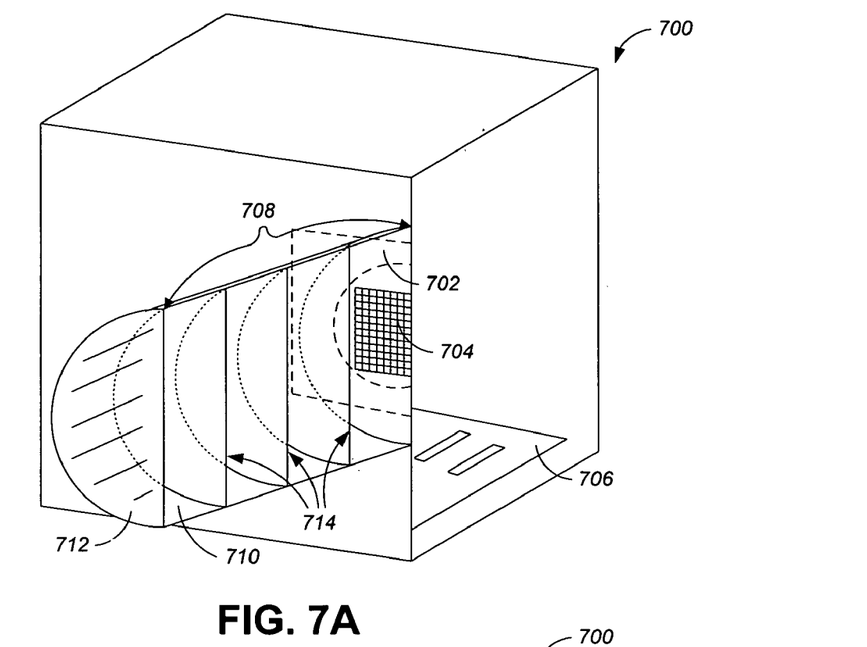
FIG. 7A is a cut-away side perspective view of an image sensor camera system.

FIG. 7A shows a cut-away side perspective view of an image sensor camera system 700. The camera system can be an active pixel sensor (APS) system or a charge-coupled device (CCD) system. The camera system 700 includes a lens system 708, a cover plate 702, an image sensor array 704, and sensor electronics 706.

The lens system 708 includes a plurality of lenses 714 mounted on a lens mount 710. The lens system 708 may also include other lensing elements, such as a filter or a polarizer 712. The contoured cover plate 702 acts as an additional lensing element.

Figure 7B:
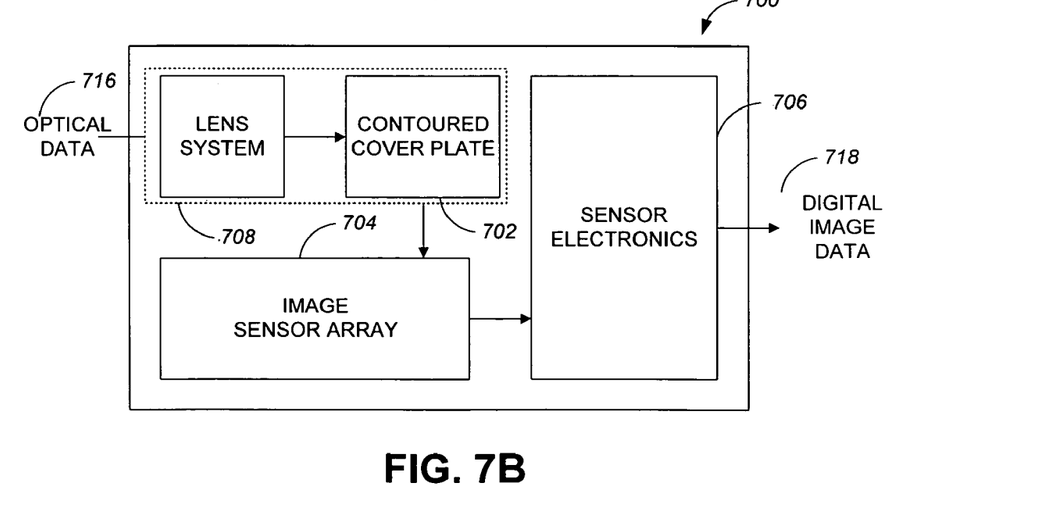
FIG. 7B is a block diagram of the image sensor camera system.

FIG. 7B shows a block diagram of the image sensor camera system 700. The camera system 700 receives optical image data 716. The optical data 716 are focused by the lens system 708 and the contoured cover plate 702 onto the image sensor array 704. The sensor electronics 706 converts electrical charge falling on the sensor array 704 to digital image data 718.

Although only a few embodiments have been described in detail above, those of ordinary skill in the art certainly understand that modifications are possible. For example, a contouring can be done on both surfaces of the cover plate. Also, while the preferred aspect shows only a square and a circular mounting structures, mounting structures of other shapes are possible, such as a hexagonal- or octogonal-shaped mounting structure. In addition, other alignment marks or lens locking mechanisms can be used on the cover plate to securely attach the lens system to the cover plate.

What is claimed is:

1. A cover for an image sensor array, the cover comprising:
    a plate formed of substantially transparent material and secured adjacent to an upper surface of and covering the image sensor array, said sensor array being sealed by said plate, said plate having a plurality of surfaces forming a lensing structure, such that at least one of said plurality of surfaces is contoured into a lensing surface capable of changing imaging characteristics; and
    a mounting structure extending from an upper surface of the plate and adapted to secure a prefabricated lens system to the plate above the lensing structure.

2. The cover of claim 1, wherein said plate is made of a transparent material which is one of glass, plastic, or plexiglass, said plate being transparent over all, or a substantial portion of, the image sensor array.

3. The cover of claim 1, wherein said lensing structure is made of at least one lensing element, said lensing structure covering all or a substantial portion of the image sensor array, such that said at least one lensing element is formed on the lensing surface.

4. The cover of claim 3, wherein said at least one lensing element is a refractive lensing element.

5. The cover of claim 4, wherein said refractive lensing element includes a concave lens.

6. The cover of claim 4, wherein said refractive lensing element includes a convex lens.

7. The cover of claim 4, wherein said refractive lensing element forms a post having at least one lensing surface.

8. The cover of claim 3, wherein said at least one lensing element is a diffractive lensing element, said diffractive lensing element blazed on the lensing surface.

9. The cover of claim 3, wherein said at least one lensing element is a hybrid refractive-diffractive lensing element, said hybrid lensing element being formed with a diffraction grating blazed on the refractive lensing surface.

10. The cover of claim 1, wherein said lensing structure also includes an alignment mark, formed on the lensing surface, to guide the prefabricated lens system being attached to the plate.

11. The cover of claim 1, wherein said mounting structure is formed by a mesa-like protrusion on the lensing surface.

12. The cover of claim 1, wherein said mounting structure is formed by a ringed-wall structure having an inside wall and an outside wall, said ringed-wall structure formed on the lensing surface.

13. The cover of claim 12, further comprising a threaded retaining ring on the inside wall for attaching the prefabricated lens system to the plate.

14. The cover of claim 12, further comprising a threaded retaining ring on the outside wall for attaching the prefabricated lens system to the plate.

15. The cover of claim 12, wherein said mounting structure is formed by a well-like depression on the lensing surface.

16. The cover of claim 15, further comprising a threaded retaining ring on the inside wall of the depression for attaching the prefabricated lens system to the plate.

17. The cover of claim 1, wherein the mounting structure extending from the upper surface of the plate is adapted to removably secure the prefabricated lens system to the plate above the lensing structure.

18. The cover of claim 1, wherein said plate and said mounting structure comprise a unitary structure.

19. A method of making an image sensor array having a lensing cover plate, the method comprising:
    forming a lensing structure on a lensing surface of a flat, substantially transparent cover plate by contouring said lensing surface of the cover plate into a lensing element to form said lensing cover plate;
    securing a mounting structure to an upper surface of the plate, said mounting structure being adapted to connect a prefabricated lens system to the plate above the lensing structure; and
    covering an image sensor array with said lensing cover plate such that said image sensor array is sealed by said cover plate.

20. The method of claim 19, wherein forming a lensing structure includes forming a diffraction grating on said lensing surface.

21. The method of claim 19, wherein said lensing structure and said cover plate are injection molded as a single-piece structure.

22. The method of claim 19, wherein said mounting structure is adapted to removably connect the prefabricated lens system to the plate above the lensing structure.

23. A method of making a camera system, comprising:
    contouring a portion of a flat cover plate to form a cover plate having a lensing structure;
    securing a mounting structure to an upper surface of the plate, said mounting structure being adapted to connect a prefabricated lens system to the plate mounting above the lensing structure;
    covering an imaging array with said cover plate, said cover plate being placed in an optical path of said camera system; and
    bonding the cover plate to an assembly to seal the imaging array.

24. A method as in claim 23, wherein contouring the cover plate to form the lensing structure includes forming at least one of a refractive lens or a diffractive lens.

25. A method as in claim 23, wherein covering the imaging array with said cover plate includes locating said cover plate adjacent said imaging array.

26. A method as in claim 23, further comprises locating at least one additional lensing element in said optical path of said camera.

27. A method as in claim 26, wherein said at least one additional lensing element is mounted to said cover plate.

28. The method of claim 23, wherein said mounting structure is adapted to removably connect the prefabricated lens system to the plate mounting above the lensing structure.

* * * * *